Sept. 9, 1947.  H. T. KRAFT  2,427,216
TIRE MOUNTING RIM
Original Filed June 9, 1942
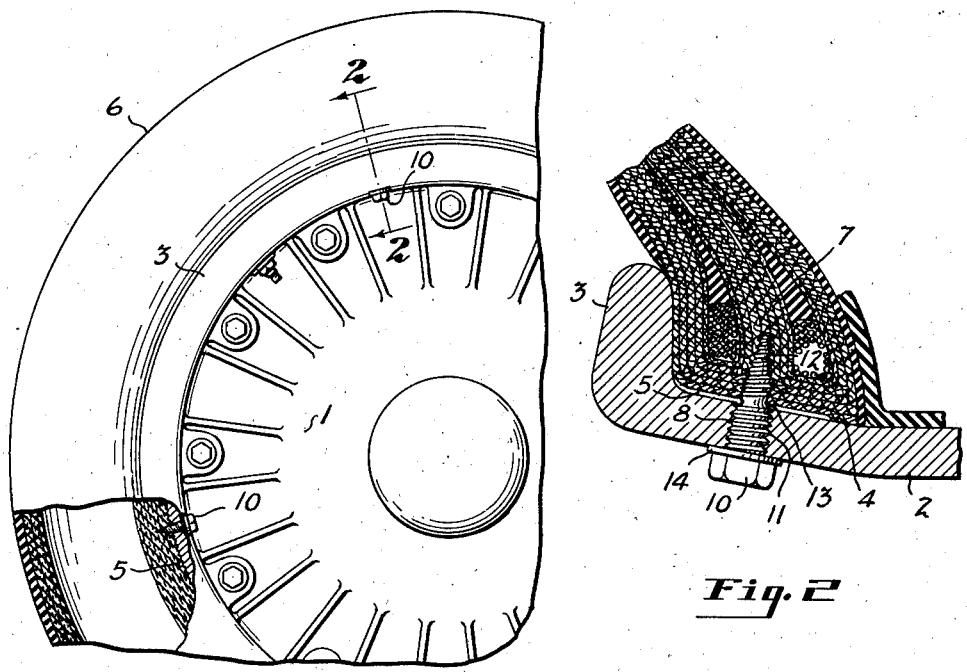
Fig.1
Fig.2
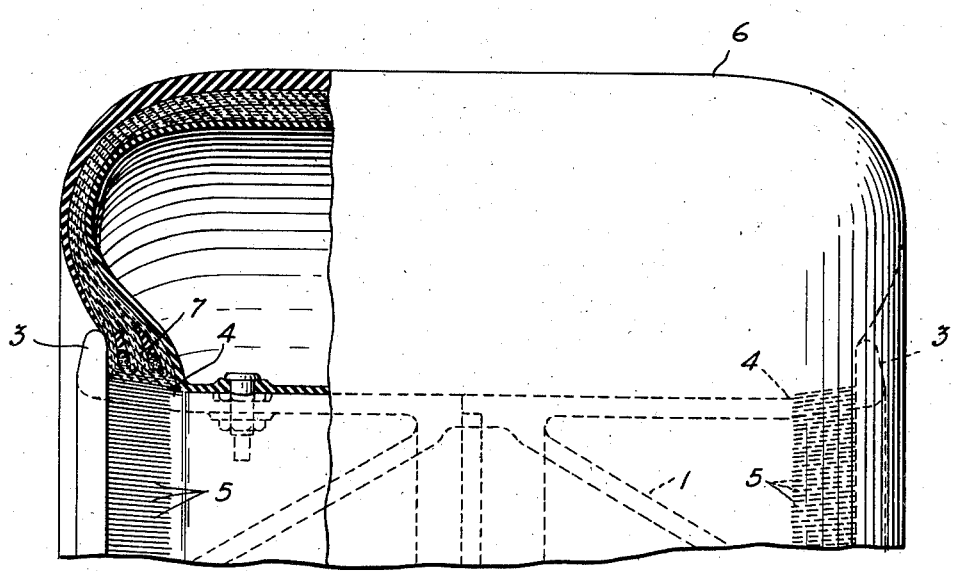
Fig.3
INVENTOR.
Herman T. Kraft
BY
Evans & McCoy
ATTORNEYS

UNITED STATES PATENT OFFICE 2,427,216

TIRE MOUNTING RIM

Herman T. Kraft, Akron, Ohio, assignor to The General Tire & Rubber Company, Akron, Ohio, a corporation of Ohio Original application June 9, 1942, Serial No. 446,356. Divided and this application January 20, 1944, Serial No. 518,927

3 Claims. (Cl. 152—384)

This invention relates to a mounting rim for pneumatic tires and more particularly to a tire mounting rim for use upon airplane landing wheels, the present application being a division of copending application Serial No. 446,356, filed June 9, 1942.

Because of the excessive forces of impact to which tires of an airplane landing wheel are subjected in service, it is desirable that the beads of the tire be very firmly anchored against circumferential slippage on the rim.

It is the object of the present invention to provide a simple and practical means for firmly anchoring a pneumatic tire to its supporting rim.

With the above and other objects in view the invention may be said to comprise the device as illustrated in the accompanying drawings hereinafter described and particularly set forth in the appended claims together with such variations and modifications thereof as will be apparent to one skilled in the art to which the invention pertains.

Reference should be had to the accompanying drawings forming part of the specification in which:

Fig. 1 is a fragmentary side elevation of a wheel embodying the invention;

Fig. 2 is a fragmentary section on an enlarged scale taken on the line indicated at 2—2 in Fig. 1; and Fig. 3 is a sectional elevation showing a portion of the tire and rim in transverse section.

Referring to the accompanying drawings the device of the present invention is shown applied to a suitable wheel 1 having tire supporting rim 2 that is provided with tire retaining flanges 3 at opposite sides thereof. The rim 2 provides an annular tire supporting base and is formed to provide inwardly tapering bead seats 4, one adjacent to each of the flanges 3. To resist slippage of the tire the external surfaces of the tapering portions 4 of the rim are provided with transverse serrations 5.

A tire 6 is mounted on the rim and has beads 7 that are internally engaged by the tapered serrated seats 4. The tapering portions 4 of the rim are each provided with circumferentially spaced threaded openings 8 that are adapted to receive tire fastening screws 10. Each of the screws 10 is provided adjacent its head with a portion 11 of uniform diameter that is threaded to screw into an opening 8. Each screw has a tapered point 12 that is adapted to pass through the opening 8 and which is provided with a thread so that it may be screwed into the tire bead 7.

The thread of the tapered point 12 preferably terminates short of the threaded portion 11, leaving a short unthreaded space 13 between the threaded portions 11 and 12.

The portions 12 and 13 of the screw are of less diameter than the opening 8 so that the screw can be inserted into the opening 8 to engage the point thereof with the interior surface of the bead 7 whereupon the screw may be turned to advance the point 12 into the bead 7 and to screw the threaded portion 11 thereof into the threaded opening 8 of the rim. The pitch of the thread on the tapered portion of the screw that engages the tire bead is greater than the pitch of the thread on the portion 11 that screws into the rim opening so that the screw exerts a radial inward thrust on the tire bead drawing the same against the serrated surface of the seat 4 as the screw is advanced into the bead.

A washer 14 may be imposed between the head of each screw and the inner surface of the rim 2 to prevent the screws from working loose. The screws 10 may be driven into the beads after the tire has been mounted on the rim and pressed tightly against the flanges 3 and seats 4 by internal air pressure. The screws 10 serve to firmly fasten the tire beads to the serrated seats and to securely hold the tire against circumferential slippage on the rim.

It is to be understood that variations and modifications of the specific device herein shown and described for purposes of illustration, may be made without departing from the spirit of the invention.

What I claim is:

1. A tire mounting rim having annular bead seating portions that are provided with threaded openings, and bead fastener screws, each having a tapered threaded bead engaging point adapted to screw into a tire bead and a portion of uniform diameter having a thread of less pitch than the thread on the tapered point and adapted to be screwed into a rim opening, whereby each screw may be simultaneously screwed into the rim and tire bead to draw the bead inwardly against its seat.

2. A tire mounting rim having annular externally serrated bead seating portions that have threaded openings, and bead fastener screws, each having a tapered threaded bead engaging point of smaller diameter than said openings and a portion of uniform diameter threaded to screw into one of said openings, the pitch of the thread on the tapered point being greater than that of the thread on the portion of uniform diameter, whereby the screws are adapted to draw the beads inwardly against said serrated seats.

3. A tire mounting rim having an annular base having tire retaining flanges at opposite sides thereof and inwardly tapering bead seating portions immediately adjacent each flange, said bead seating portions having transverse serrations and each having circumferentially spaced threaded openings, and bead fastener screws each having a head, a threaded portion adjacent the head adapted to screw into a rim opening and a tapered bead engaging point adapted to pass through the rim opening and provided with a thread of greater pitch than the rim engaging thread.

HERMAN T. KRAFT.

REFERENCES CITED

The following references are of record in the file of this patent:

UNITED STATES PATENTS

| Number | Name | Date |
|---|---|---|
| 722,459 | Schaefer | Mar. 10, 1903 |
| 784,875 | Mulholland | Mar. 14, 1905 |
| 779,730 | Neary | Jan. 10, 1905 |
| 548,745 | Crawford | Oct. 29, 1895 |
| 1,396,515 | McClevey | Nov. 8, 1921 |
| 197,933 | Harvey | Dec. 11, 1877 |

FOREIGN PATENTS

| Number | Country | Date |
|---|---|---|
| 541,740 | Great Britain | 1941 |
| 12,563 | Great Britain | 1909 |